United States Patent
Prajapati et al.

(10) Patent No.: US 12,078,605 B2
(45) Date of Patent: Sep. 3, 2024

(54) METHODS OF FABRICATION OF NANO-SENSOR AND NANO-SENSOR ARRAY

(71) Applicant: Indian Institute of Science, Bangalore (IN)

(72) Inventors: Chandra Shekhar Prajapati, Bangalore (IN); Navakanta Bhat, Bangalore (IN)

(73) Assignee: Indian Institute of Science, Bangalore Karnataka (IN)

( * ) Notice: Subject to any disclaimer, the term of this patent is extended or adjusted under 35 U.S.C. 154(b) by 489 days.

(21) Appl. No.: 16/756,743

(22) PCT Filed: Oct. 16, 2018

(86) PCT No.: PCT/IN2018/050670
§ 371 (c)(1),
(2) Date: Apr. 16, 2020

(87) PCT Pub. No.: WO2019/077630
PCT Pub. Date: Apr. 25, 2019

(65) Prior Publication Data
US 2020/0240942 A1    Jul. 30, 2020

(30) Foreign Application Priority Data
Oct. 16, 2017   (IN) .............................. 201741036760

(51) Int. Cl.
*G01N 27/12* (2006.01)
*B82Y 15/00* (2011.01)
*B82Y 40/00* (2011.01)

(52) U.S. Cl.
CPC ............ *G01N 27/127* (2013.01); *B82Y 15/00* (2013.01); *B82Y 40/00* (2013.01)

(58) Field of Classification Search
CPC ....... G01N 27/127; B82Y 15/00; B82Y 40/00
(Continued)

(56) References Cited

U.S. PATENT DOCUMENTS

| | | | | |
|---|---|---|---|---|
| 5,417,821 A | * | 5/1995 | Pyke | G01N 33/2841 205/785.5 |
| 7,238,594 B2 | | 7/2007 | Fonash et al. | |
| 2016/0169824 A1 | * | 6/2016 | Shin | G01N 27/127 73/31.06 |

FOREIGN PATENT DOCUMENTS

WO    WO-2019077630 A1    4/2019

OTHER PUBLICATIONS

"International Application No. PCT/IN2018/050670, International Search Report and Written Opinion mailed Jan. 28, 2019", (Jan. 28, 2019), 9 pgs.

(Continued)

*Primary Examiner* — Ori Nadav
(74) *Attorney, Agent, or Firm* — Schwegman Lundberg & Woessner, P.A.

(57) ABSTRACT

Methods of fabrication and nano-sensor and nano-sensor array thereof are provided. A sensing electrode assembly can be patterned on a sacrificial layer of a substrate. The sensing electrode assembly can comprise a pair of contact pads and an electrode element coupled to and disposed between the pair of contact pads. The sensing electrode assembly can be formed on the patterned sensing electrode assembly. The sacrificial layer below a portion of the electrode element can be removed to obtain a suspended electrode element. The suspended electrode element can be oxidized at a first predetermined temperature to obtain a pair of electromigrated regions and a notch portion between the pair of the electromigrated regions. The notch portion can be used to detect a gaseous component in an ambient gas at a second predetermined temperature.

5 Claims, 8 Drawing Sheets

(58) Field of Classification Search
USPC .......................................................... 204/645
See application file for complete search history.

(56) References Cited

OTHER PUBLICATIONS

Lienig, Jens, "Introduction to Electromigration-Aware Physical Design", In Proceedings of the 2006 International Symposium on Physical Design, ACM, (Apr. 10, 2006), 39-46.

* cited by examiner

100

┌─────────────────────────────────────────────────────────────────────────┐
│ PATTERNING A SENSING ELECTRODE ASSEMBLY ON A SACRIFICIAL LAYER OF A SUBSTRATE, │
│ WHEREIN THE SENSING ELECTRODE ASSEMBLY COMPRISES A PAIR OF CONTACT PADS AND │
│ AN ELECTRODE ELEMENT COUPLED TO AND DISPOSED BETWEEN THE PAIR OF CONTACT │
│ PADS                                                                    │
│ 102                                                                 │
└─────────────────────────────────────────────────────────────────────────┘
                                    ▼
┌─────────────────────────────────────────────────────────────────────────┐
│ FORMING THE SENSING ELECTRODE ASSEMBLY BASED ON THE PATTERNING          │
│ 104                                                                 │
└─────────────────────────────────────────────────────────────────────────┘
                                    ▼
┌─────────────────────────────────────────────────────────────────────────┐
│ REMOVING THE SACRIFICIAL LAYER BELOW A PORTION OF THE ELECTRODE ELEMENT TO │
│ OBTAIN A SUSPENDED ELECTRODE ELEMENT                                    │
│ 106                                                                 │
└─────────────────────────────────────────────────────────────────────────┘
                                    ▼
┌─────────────────────────────────────────────────────────────────────────┐
│ OXIDIZING THE SUSPENDED ELECTRODE ELEMENT AT A FIRST PREDETERMINED      │
│ TEMPERATURE TO OBTAIN A PAIR OF ELECTROMIGRATED REGIONS AND A NOTCH PORTION │
│ BETWEEN THE PAIR OF THE ELECTROMIGRATED REGIONS, WHEREIN THE NOTCH PORTION IS │
│ TO DETECT A GASEOUS COMPONENT IN AN AMBIENT GAS AT A SECOND PREDETERMINED │
│ TEMPERATURE                                                             │
│ 108                                                                 │
└─────────────────────────────────────────────────────────────────────────┘

┌─────────────────────────────────────────────────────────────────────────────┐
│ PATTERNING A SENSING ELECTRODE ASSEMBLY ON A SACRIFICIAL LAYER OF A SUBSTRATE, │
│ WHEREIN THE SENSING ELECTRODE ASSEMBLY COMPRISES A PAIR OF COMMON CONTACT     │
│ PADS AND A PLURALITY OF ELECTRODE ELEMENTS COUPLED TO AND DISPOSED BETWEEN    │
│ THE PAIR OF COMMON CONTACT PADS                                               │
│ 402                                                                           │
└─────────────────────────────────────────────────────────────────────────────┘
                                      ▼
┌─────────────────────────────────────────────────────────────────────────────┐
│ FORMING THE SENSING ELECTRODE ASSEMBLY BASED ON THE PATTERNING                │
│ 404                                                                           │
└─────────────────────────────────────────────────────────────────────────────┘
                                      ▼
┌─────────────────────────────────────────────────────────────────────────────┐
│ REMOVING THE SACRIFICIAL LAYER BELOW A PORTION OF THE PLURALITY OF ELECTRODE  │
│ ELEMENTS TO OBTAIN A PLURALITY OF SUSPENDED ELECTRODE ELEMENT                 │
│ 406                                                                           │
└─────────────────────────────────────────────────────────────────────────────┘
                                      ▼
┌─────────────────────────────────────────────────────────────────────────────┐
│ APPLYING A POTENTIAL DIFFERENCE BETWEEN THE PAIR OF CONTACT PADS TO OXIDIZE   │
│ THE PLURALITY OF SUSPENDED ELECTRODE ELEMENTS AT A FIRST PREDETERMINED        │
│ TEMPERATURE TO OBTAIN A PAIR OF ELECTROMIGRATED REGIONS ON EACH SUSPENDED     │
│ ELECTRODE ELEMENT AND A NOTCH PORTION BETWEEN THE PAIR OF THE                 │
│ ELECTROMIGRATED REGIONS, WHEREIN THE NOTCH PORTION IS TO DETECT A GASEOUS     │
│ COMPONENT IN AN AMBIENT GAS AT A SECOND PREDETERMINED TEMPERATURE             │
│ 408                                                                           │
└─────────────────────────────────────────────────────────────────────────────┘

Fig. 4

METHODS OF FABRICATION OF NANO-SENSOR AND NANO-SENSOR ARRAY

PRIORITY CLAIM TO RELATED APPLICATIONS

This application is a U.S. national stage filing under 35 U.S.C. § 371 from International Application No. PCT/IN2018/050670, filed on 16 Oct. 2018, and published as WO2019/077630 on 25 Apr. 2019, which claims the benefit under 35 U.S.C. 119 to India Application No. 201741036760, filed on 16 Oct. 2017, the benefit of priority of each of which is claimed herein, and which applications and publication are hereby incorporated herein by reference in their entirety.

TECHNICAL FIELD

The present disclosure generally relates to chemical sensors, and in particular, to nano-sensors and to fabrication methods thereof.

BACKGROUND

Chemical sensors are devices used to identify components of gaseous mixtures, for example, toxic and harmful gases. Chemical sensors may be, for example, combustible gas sensors, photoionization detectors, infrared point sensors, ultrasonic sensors, electrochemical gas sensors, solid-state sensors, and the like.

Generally, solid-state sensors detect gases by a chemical reaction that takes place when the gases come in direct contact with the sensor's chemically active component. Metal oxides, such as tin dioxide, are generally used in solid-state sensors as active components. An electrical parameter, for example, the electrical resistance of metal oxide in the sensor changes when it comes in contact with the monitored gas which can be measured to detect the gas being tested.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components.

FIG. 1 illustrates a method for fabricating a nano-sensor, in accordance with an implementation of the present subject matter.

FIG. 4 illustrates a method for fabricating a nano-sensor array, in accordance with an implementation of the present subject matter.

DETAILED DESCRIPTION

Figure 2:
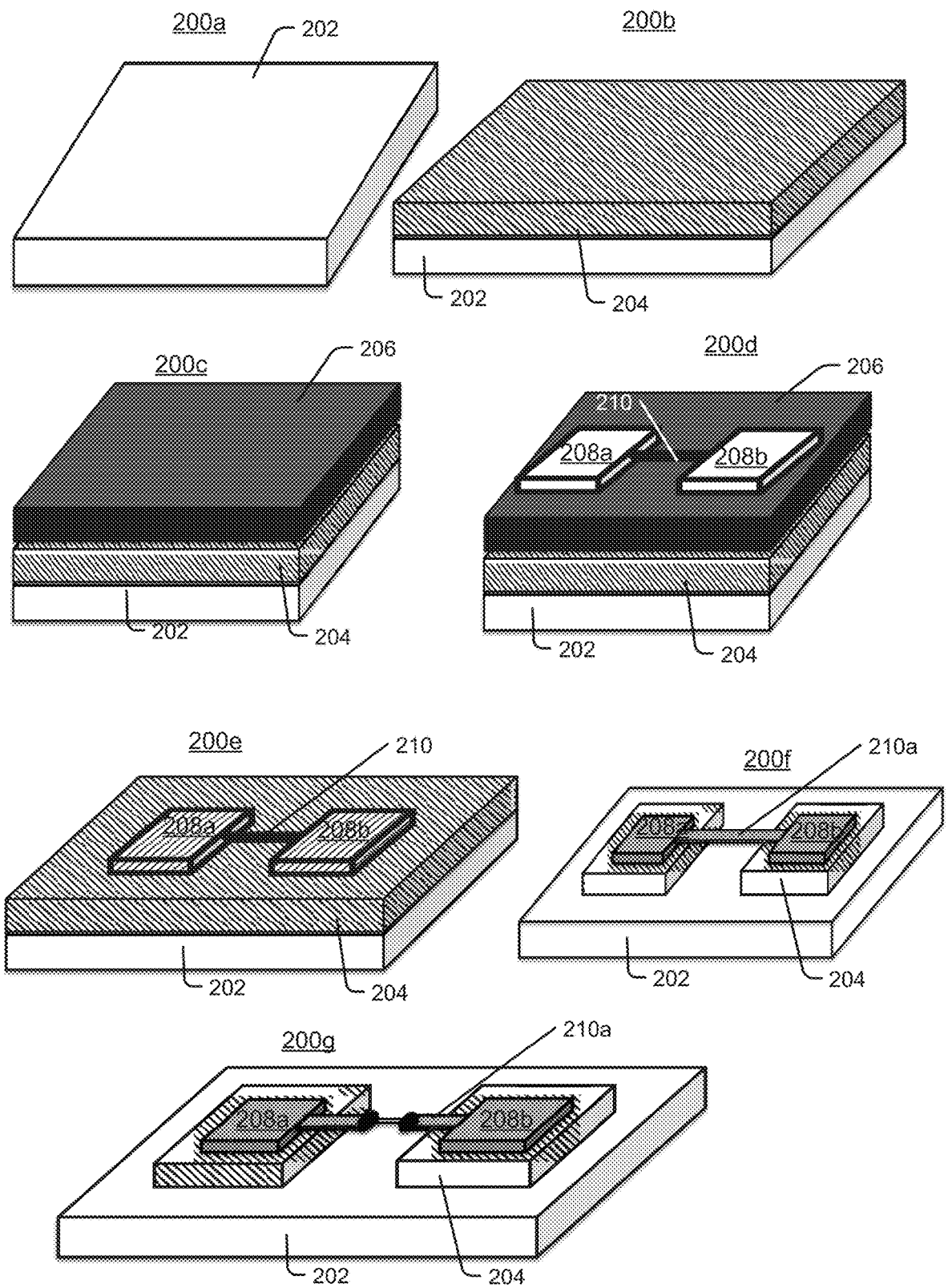
FIG. 2 illustrates a pictorial representation of the method, in accordance with an implementation of the present subject matter.

The present subject matter provides a nano-sensor and a method of fabricating the nano-sensor. Further, the present subject matter provides an array comprising at least two nano-sensors and a method of fabricating thereof.

Chemical sensors are devices used to identify components of gaseous mixtures, such as, toxic and harmful gases. In some cases, the amount/composition of the components in the gaseous mixtures may also be determined by the chemical sensors. Solid-state sensors detect gases by a chemical reaction that takes place when the gases come in contact with an active material provided as part of the chemical sensor. For example, metal oxide, such as, tin dioxide can be used as active material in chemical sensors.

Generally, initially, the chemical sensor is exposed to clean air so that oxygen present in the clean air is adsorbed on the metal oxide surface. The high electron affinity of adsorbed oxygen attracts free electrons inside the metal oxide, forming a potential barrier at the grain boundaries. This potential barrier prevents electron flow, causing high sensor resistance in clean air. When the chemical sensor is subsequently exposed to the gas to be detected, such as carbon monoxide, oxidation reaction of such gas with the adsorbed oxygen occurs at the surface of metal oxide. This results in change in resistance of metal oxide of the chemical sensor. The change in resistance can be used to detect the presence and concentration of the gas to be detected.

Chemical sensors are assessed for their gas detection performance based on certain performance characteristics, such as, sensitivity, selectivity, limit of detection, response time, recovery time, sensor stability, and the like. In general, miniaturized solid-state sensors, such as micro-sensors provide small-form factor, low cost, and good compatibility with Micro Electro Mechanical Systems (MEMS). These micro-sensors, generally, require high temperature of operation corresponding to chemical reaction activation energy.

The performance characteristics of micro-sensors can be improved by changing an operating temperature of the micro-sensor. Therefore, conventionally available micro-sensors are provided with a heater of micron-scale to manage the operating temperature of the micro-sensor. However, the micro-sensors consume high power due to the presence of the microheaters. Generally, a size of the microheater varies in the range of tens to hundreds of microns.

To reduce power consumption, techniques, such as miniaturization of chemical sensors have been used. In general, to miniaturize chemical sensors, unidimensional nano-structures, such as nano-ribbons, nano-wires, and nano-belts have been used. However, nano-sensors with unidimensional nano-structures are difficult to fabricate. Fabrication of such nano-sensors, typically, require bottom up manufacturing and high temperature processing, which is, generally, not compatible with silicon foundries and Complementary Metal Oxide Semiconductor (CMOS) technology.

The present subject matter provides a method for fabricating a solid-state nano-sensor and the nano-sensor array thereof. Nano-sensors, as will be understood, are chemical sensors which have at least one dimension in the scale of nanometers. The present disclosure also provides a method for fabricating a solid-state nano-sensor and the nano-sensor array thereof. The methods provided by the present subject matter uses a simple top-down manufacturing technique. Further, the nano-sensor fabricated from the method of the present subject matter uses a metal oxide sensitive layer formed on the nano-sensor for sensing the gaseous component at lower temperatures, for example, room temperature, therefore, mitigating requirement of a nano or microheater and reducing power consumption. The nano-sensor also has a high selectivity to detect sub-ppm ranges of gaseous components. The nano-sensor of the present subject matter provides a low limit of detection (LOD), and a fast response and recovery time.

In an example, to fabricate the nano-sensor, a sensing electrode assembly can be patterned on a sacrificial layer of a substrate. The sensing electrode assembly can comprise a pair of contact pads and an electrode element coupled to and disposed between the pair of contact pads. The sensing electrode assembly can be formed on the patterned sensing electrode assembly. The sacrificial layer below a portion of the electrode element can be removed to obtain a suspended electrode element.

The suspended electrode element can be oxidized at a first predetermined temperature to obtain a pair of electromigrated regions and a notch portion between the pair of the electromigrated regions. The notch portion can be used to detect a gaseous component in an ambient gas at a second predetermined temperature. In an example, the first predetermined temperature is in a range of 600-800° C. and the second predetermined temperature is in a range of 20-50° C. The present subject matter also provides a method for fabricating a nano-sensor array comprising a plurality of the nano-sensors. The present subject matter also provides a nano-sensor and a nano-sensor array fabricated from respective methods, thereof.

The methods use a top-down processing technique to fabricate the nano-sensor and the nano-sensor array, thereby, reducing complexity of fabrication. Further, the nano-sensor and the nano-sensor array has a high selectivity to detect sub-ppm ranges of gaseous components in the ambient air with low power consumption.

The above and other features, aspects, and advantages of the subject matter will be better explained with regard to the following description and accompanying figures. It should be noted that the description and figures merely illustrate the principles of the present subject matter along with examples described herein and, should not be construed as a limitation to the present subject matter. It is thus understood that various arrangements may be devised that, although not explicitly described or shown herein, embody the principles of the present disclosure. Moreover, all statements herein reciting principles, aspects, and examples thereof, are intended to encompass equivalents thereof. Further, for the sake of simplicity, and without limitation, the same numbers are used throughout the drawings to reference like features and components.

FIG. 1 depicts a method 100 for fabricating a nano-sensor, in accordance with an implementation of the present subject matter. The order in which the method 100 is described is not intended to be construed as a limitation, and any number of the described method blocks can be combined in any order to implement the methods or an alternative method. Additionally, individual blocks may be deleted from the method 100 without departing from the scope of the subject matter described herein.

At block 102, a sensing electrode assembly can be patterned on a sacrificial layer of a substrate. In one example, prior to patterning the sensing electrode assembly, the sacrificial layer may be deposited on the substrate. The sacrificial layer may be a semiconductor, such as silicon dioxide, silicon nitride, and the like. The substrate may be a semiconductor, such as silicon, ceramic, plastic, and the like. The sacrificial layer can be deposited on the substrate by deposition techniques, such as, Chemical Vapor Deposition (CVD), Metal-Organic Chemical Vapor Deposition (MOCVD), and the like.

The sensing electrode assembly can be patterned on the sacrificial layer. In an example, the sensing electrode assembly can be patterned by using Electron Beam Lithography (EBL) using polymethyl methacrylate (PMMA) as a photoresist. However, it is to be understood that other lithography techniques and other resists known in the art may be used.

In an example, the sensing electrode assembly can comprise a pair of contact pads and an electrode element. The electrode element can be coupled to and disposed between the pair of contact pads. The sensing electrode assembly is explained in detail with reference to FIG. 2.

At block 104, the sensing electrode assembly can be formed based on the patterning. The sensing electrode assembly can be formed by using sputtering techniques, such as, Direct Current sputtering (DC-sputtering), electron beam evaporation, and the like. The sensing electrode assembly can be fabricated from metals, such as tungsten, nickel, palladium, titanium, platinum, and the like. In an example, the sensing electrode assembly can have a thickness in a range of 10-60 nm. In an example, the pair of contact pads and the electrode element can have different thickness. In one example, the electrode element may be a nano-wire, a nano-ribbon, and the like.

At block 106, the sacrificial layer below a portion of the electrode element of the sensing electrode can be removed to obtain a suspended electrode element. In an example, removing the sacrificial layer is by etching, such as dry etching, wet etching, and the like. The etching can be isotropic in nature. In an example, Reaction Ion Etching (RIE) may be used to remove the sacrificial layer. It is to be understood that any other technique to remove the sacrificial layer may be used.

At block 108, the suspended electrode element can be oxidized. The suspended electrode element may be oxidized at a first predetermined temperature. In an example, to oxidize the suspended electrode element, a potential difference may be applied between the pair of contact pads for a predetermined time and the electrode element can be exposed to rich oxygen ambient to oxidize the electrode element. As will be understood, rich oxygen ambient is an environment with 100% oxygen.

In an example, the potential difference can be applied for a predetermined time to heat the electrode element to the first predetermined temperature by joule self-heating. In an example, the potential difference applied is in a range of 0.3-0.7 V, the first predetermined temperature can be in a range of 600-800° C., and the predetermined time is 10-20 minutes. In one example, the potential difference applied depends on the thickness of the sensing electrode assembly. In one example, the potential difference applied depends on the thickness of the electrode element.

The range in which the potential difference may be applied depends on the material of the suspended electrode element. For example, in some cases, a potential difference of less than 0.3 V may cause reduced or no oxidation of the suspended electrode element and potential difference of more than 0.7 V may cause the suspended electrode element to break. Application of the potential difference, and thereby heating of the suspended electrode element, causes the suspended electrode element to form a pair of electromigrated regions and a notch portion between the pair of electromigrated regions. In one example, the potential difference may be applied to the pair of contact pads in ambient air.

On reaching the first predetermined temperature, the suspended electrode element may be exposed to rich oxygen ambient to oxidize the suspended electrode element. On oxidation, the notch portion and the pair of electromigrated regions get coated with an oxide of the metal that forms the suspended electrode assembly. The notch portion can have a thicker layer of oxide compared to the pair of electromigrated regions. The oxide can behave as an active material for detection of a gaseous component in an ambient gas. As the notch portion has the thicker layer of oxide, the notch portion can detect the gaseous component in an ambient gas with high sensitivity.

In one example, the notch portion can be used to detect the gaseous component at a second predetermined temperature. The second predetermined temperature can be less than the first predetermined temperature. For example, the second predetermined temperature may be in a range of 20-50° C.

The method 100 of the present subject matter, therefore, uses joule self-heating to create the oxide coated suspended electrode element at a higher temperature corresponding to the first predetermined temperature. The oxide coated suspended electrode element may then be used at a lower temperature corresponding to the second predetermined temperature to detect the gaseous component. Therefore, the method 100 of the present subject matter provides a simple top-down fabrication technique and provides a nano-sensor which can be used at the lower temperature and does not require an additional nano-heater.

FIG. 2 depicts a pictorial representation of the method 100, in accordance with an implementation of the present subject matter. Representation 200a-200g are pictorial representations of the blocks as shown in the method 100. Representation 200a depicts a substrate 202. Representation 200b represents depositing of a sacrificial layer 204 on the substrate 202.

Representation 200c depicts coating of a resist 206 on the sacrificial layer 204. Representation 200d depicts patterning of the sensing electrode assembly on the sacrificial layer 204. Representation 200e depicts forming of the sensing electrode assembly and dissolution of the resist. The sensing electrode assembly as shown in representation 200e can comprise a pair of contact pads 208a and 208b with an electrode element 210 disposed between and coupled to the pair of contact pads 208a and 208b.

Representation 200f depicts removal of the sacrificial layer 204 to obtain the suspended electrode element. For sake of discussion, electrode element in contact with the sacrificial layer 204 is referred to as electrode element 210 and electrode element with the portion suspended above and not in contact with the sacrificial layer 204 is referred to as suspended electrode element 210a. Representation 200g depicts providing a potential difference between the pair of contact pads 208a and 208b to obtain a nano-sensor comprising the sensing electrode assembly formed on the sacrificial layer comprising the pair of contact pads 208a and 208b and the suspended electrode element 210a coupled to and disposed between the pair of contact pads 208a and 208b. The nano-sensor is explained in detail with reference to FIG. 3.

Figure 3A:
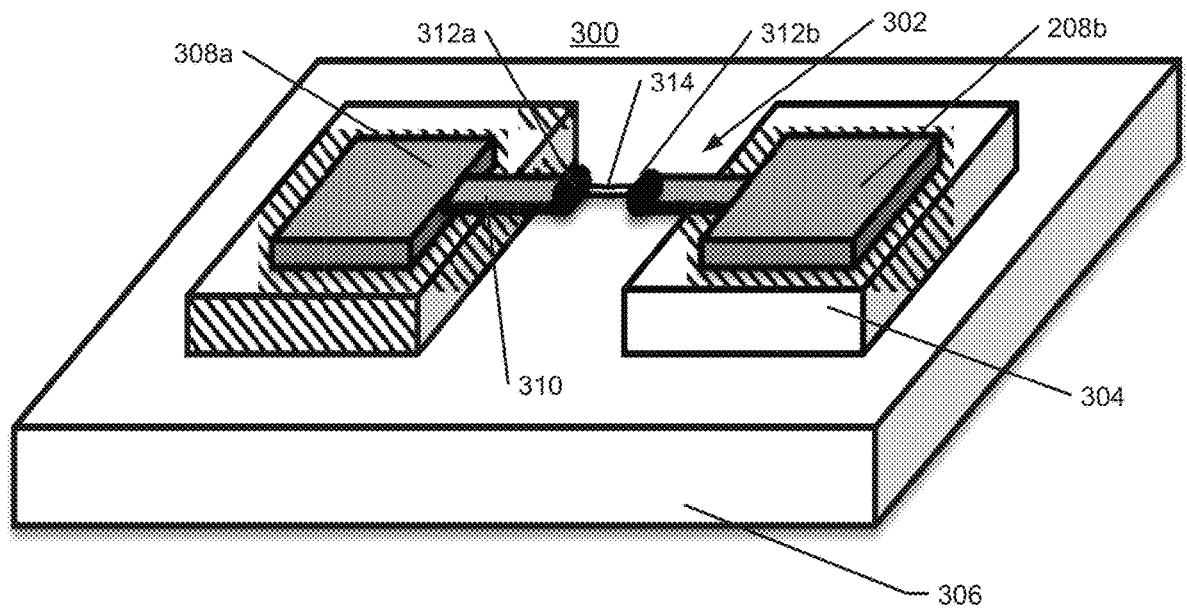
FIG. 3(a) illustrates an example nano-sensor, in accordance with an implementation of the present subject matter.

FIG. 3 depicts an example nano-sensor 300, in accordance with an implementation of the present subject matter. In an example, the nano-sensor 300 may be fabricated from the method 100.

The nano-sensor 300 can comprise a sensing electrode assembly 302. The sensing electrode assembly 302 can be formed on a sacrificial layer 304. The sacrificial layer 304 may be formed on a substrate 306. In an example, a thickness of the sacrificial layer 304 is in a range of 10 nm to 100 nm and a thickness of the substrate 306 is in a range of 50 µm to 500 µm.

The sensing electrode assembly 302 can comprise a pair of contact pads 308a and 308b. In one example, the pair of contact pads 308a and 308b may be similar to the pair of contact pads 208a and 208b. The sensing electrode assembly 302 can further comprise a suspended electrode element 310 coupled to and disposed between the pair of contact pads 308a and 308b.

The suspended electrode element 310 can comprise a pair of electromigrated regions 312a and 312b and a notch portion 314 between the pair of the electromigrated regions 312a and 312b. The notch portion 314 can be used to detect a gaseous component in an ambient gas at a second predetermined temperature. The notch portion 314 between the pair of electromigrated regions 312a and 312b can have a length in a range of 100-300 nm. The pair of electromigrated regions 312a and 312b and the notch portion 314 is explained in detail with reference to FIG. 3(b).

Figure 3B:
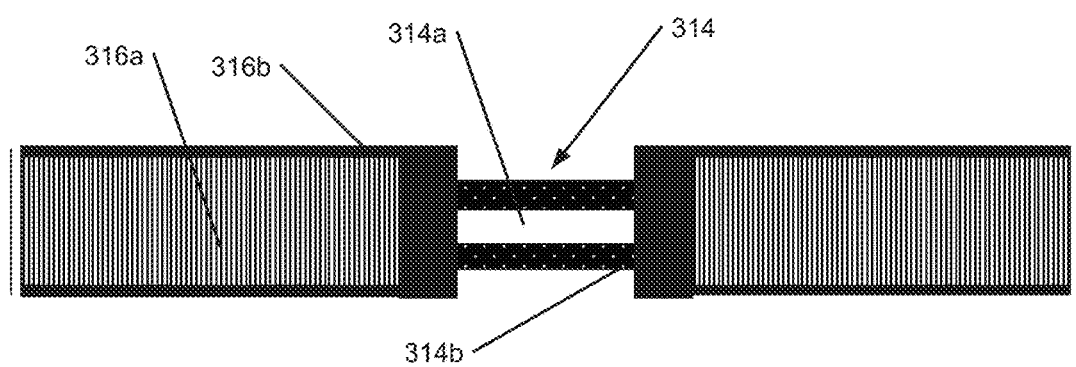
FIG. 3(b) illustrates a magnified view of a notch portion of the example nano-sensor, in accordance with an implementation of the present subject matter.

FIG. 3(b) depicts a top cross-sectional view of the suspended electrode element 310, in accordance with an implementation of the present subject matter. The notch portion 314 can comprises a first core 314a enclosed within a first shell 314b. The first core 314a can be formed from metal selected from the group of tungsten, nickel, palladium, titanium, and platinum. The first core 314a can have a thickness in a range of 1-60 nanometers. The first shell 314b can be formed from a metal oxide of the first core 314a. For example, when the first core 314a is formed from platinum, the first shell can be formed from platinum oxide. In an example, the first shell 314b has a thickness in a range of 1-60 nm.

A similar core and shell structure may be formed at the pair of electromigrated regions 312a and 312b. For sake of discussion, structure of the pair of electromigrated region is explained with reference to electromigrated region 312a. The electromigrated region can comprise a second core 316a and a second shell 316b enclosing the second core 316a.

The second core 316a can be formed from the metal of the first core 314a. In an example, the second core has a thickness in a range of 1-60 nanometers. The second shell 316b can be formed from the metal oxide of the second core 316a. The second shell 316b can have a thickness of 1-60 nanometers. Metal oxide of the first shell 314b and the second shell 316b behave as an active component for detection of a gaseous component in ambient gas. In an example, the thickness of the first shell 314b may be greater than the thickness of the second shell 316b, metal oxide of the first shell 314b behaves as the active material of the nano-sensor 300.

In operation, with reference to FIG. 3, a first voltage may be applied across the pair of contact pads 308a and 308b at the second predetermined temperature and exposed to the ambient gas. On exposure to the gaseous component, metal oxide of the first shell 314b reacts with the gaseous component in the ambient gas that the nano-sensor 300. Reaction of the gaseous component with metal oxide causes a change in electrical resistance. The change in electrical resistance can be measured and used to detect and measure concentration of the gaseous component. While a single nano-sensor 300 can be used for detection of a single gaseous component, multiple nano-sensors can be provided on a single die, for example, as a nano-sensor array, to increase efficiency of detection of the gaseous component.

FIG. 4 illustrates a method 400 for fabricating a nano-sensor array, in accordance with an implementation of the present subject matter. The order in which the method 400 is described is not intended to be construed as a limitation, and any number of the described method blocks can be combined in any order to implement the methods or an alternative method. Additionally, individual blocks may be deleted from the method 400 without departing from the scope of the subject matter described herein.

At block 402, a sensing electrode assembly can be patterned on a sacrificial layer of the substrate. The sensing electrode assembly can comprise a pair of common contact pads and a plurality of electrode elements coupled to and disposed between the pair of common contact pads. The pair of common contact pads may be similar to the pair of contact pads 308a and 308b. The sensing electrode assembly can comprise a plurality of electrode elements coupled to and disposed between the pair of common contact pads. In an example, each of the plurality of electrode elements may be similar to electrode element 310. The sensing electrode assembly can be patterned on the sacrificial layer by lithography techniques as will be understood.

At block 404, the sensing electrode assembly can be formed on the patterning. The sensing electrode assembly may be formed, as previously explained, by sputtering and the like. At block 406, the sacrificial layer below a portion of each of the plurality of electrode elements to obtain a plurality of suspended electrode elements. In an example, each of the plurality of suspended electrode elements may be suspended electrode element 310.

At block 408, a potential difference can be applied between the pair of contact pads to oxidize the plurality of suspended electrode elements at a first predetermined temperature. On application of the potential difference, a pair of electromigrated regions and a notch portion can be obtained on each suspended electrode element. The notch portion can be formed between the pair of the electromigrated regions. In an example, the pair of electromigrated regions may be the pair of electromigrated regions 312a and 312b and the notch portion may be notch portion 314. The notch portion of the plurality of suspended electrode elements may be used to detect a gaseous component in an ambient gas at a second predetermined temperature.

Figure 5:
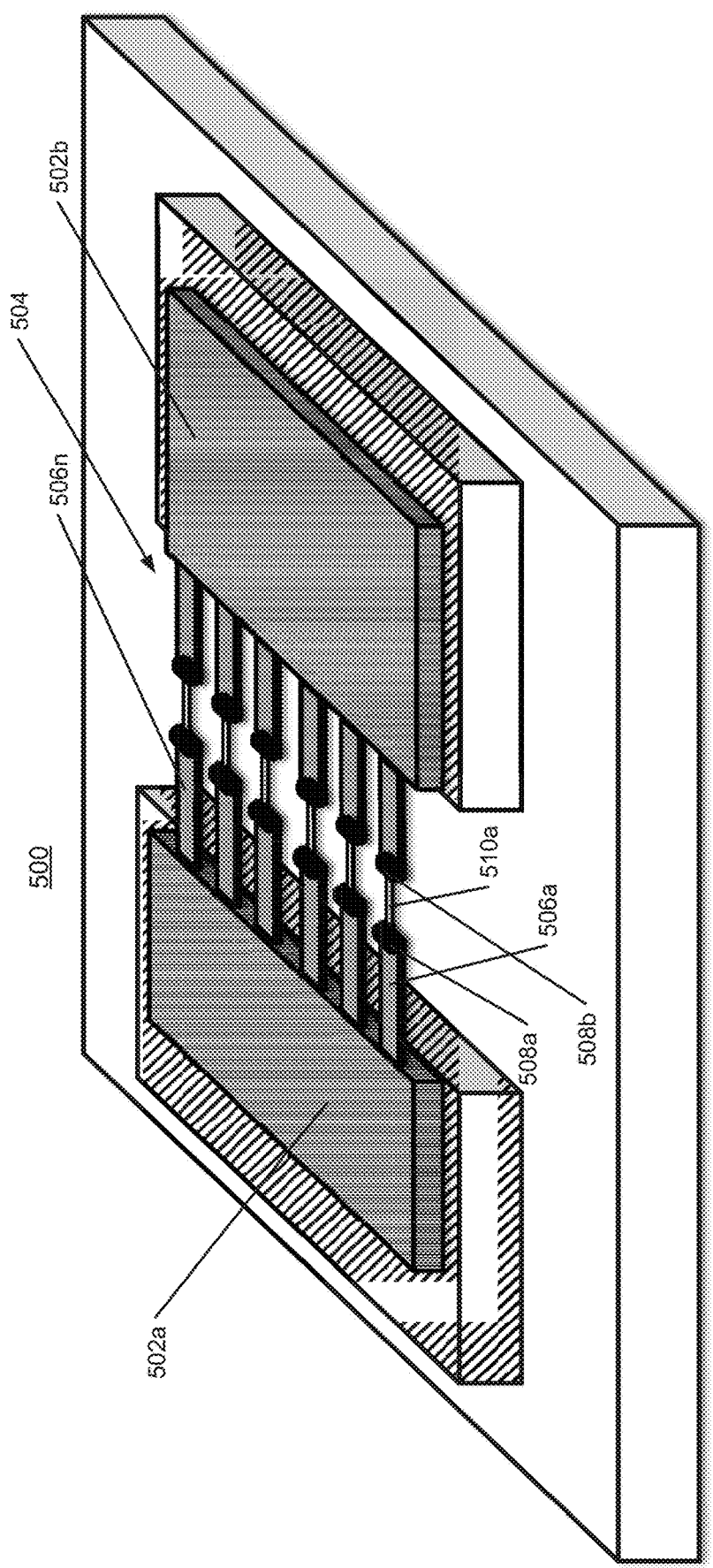
FIG. 5 illustrates an example nano-sensor array, in accordance with an implementation of the present subject matter.

FIG. 5 illustrates an example nano-sensor array 500, in accordance with an implementation of the present subject matter. The nano-sensor array 500 can comprise a plurality of nano-sensors 500, in an example, each of the plurality of nano-sensors may be nano-sensor 300 as shown in FIG. 5. In another example, to obtain optimization in performance and arrangement, the nano-sensor array 500 comprising the plurality of nano-sensors may be modified to include a pair of common contact pads 502a and 502b as explained with reference to FIG. 5.

The nano-sensor array 500 can comprise the sensing electrode assembly 504. The sensing electrode assembly 504 can comprise the pair of common contact pads 502a and 502b and a plurality of suspended electrode elements 506a ... 506n, each of which is coupled to and disposed between the pair of common contact pads 502a and 502b.

Each of the plurality of suspended electrode elements 506a ... 506n can comprise a pair of electromigrated regions. For example, suspended electrode element 506a can comprise the pair of electromigrated regions 508a and 508b. In an example, the pair of the electromigrated regions 508a and 508b may be the pair of electromigrated regions 312a and 312b.

Each of the plurality of suspended electrode elements 506a ... 506n can comprise a notch portion between the pair of electromigrated regions. In an example, suspended electrode element 506a can comprise the notch portion 510a between the pair of electromigrated regions 508a and 508b. In an example, the notch portion 510a may be similar to notch portion 314.

The present subject matter will now be illustrated with working examples, which are intended to illustrate the working of disclosure and not intended to be taken restrictively to imply any limitations on the scope of the present disclosure. Unless defined otherwise, all technical and scientific terms used herein have the same meaning as commonly understood to one of ordinary skill in the art to which this disclosure belongs. It is to be understood that this disclosure is not limited to the particular methods and experimental conditions described, as such methods and conditions may vary depending on the process and inputs used as will be easily understood by a person skilled in the art.

EXAMPLES

Example 1

Transmission Electron Microscopy—Energy Dispersive Spectroscopy (TEM-EDS)

In this example, a platinum based nano-sensor was prepared. In the platinum based nano-sensor, the pair of contacts pads and the electrode element is fabricated from platinum. The first shell and second shell of the pair of electromigrated regions and notch portion is oxidized to platinum oxide ($PtO_x$). Structure of the platinum based nano-sensor was studied using Transmission Electron Microscopy—Energy Dispersive Spectroscopy (TEM-EDS).

Figure 6A:
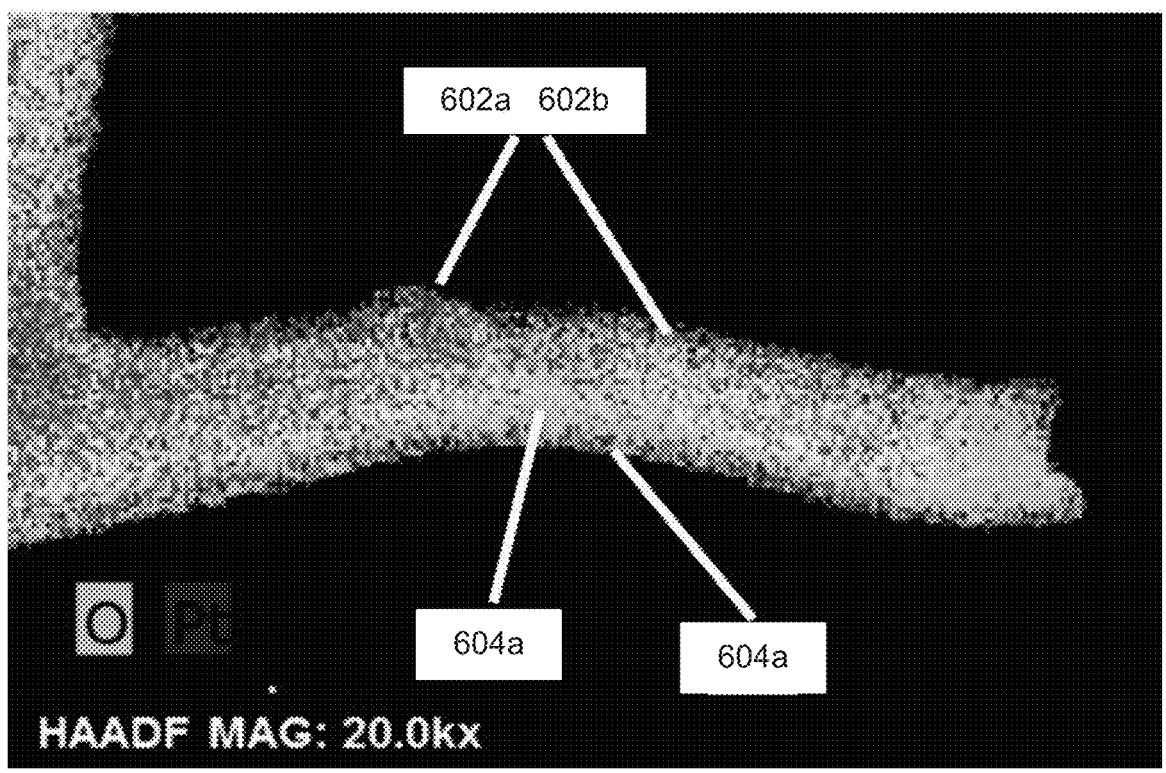
FIG. 6(a) illustrates a Transmission Electron Microscopy—Energy Dispersive Spectroscopy (TEM-EDS) image showing oxidation, in accordance with an implementation of the present subject matter.
Figure 6B:
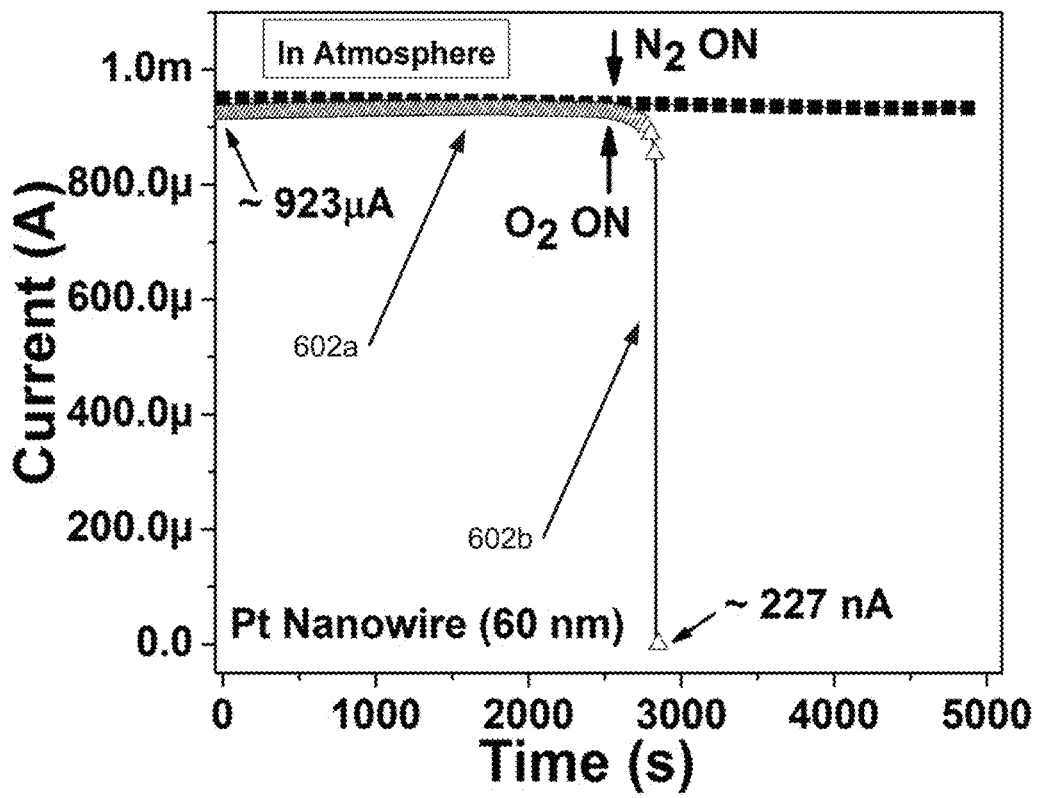
FIG. 6(b) illustrates a graph depicting real time monitoring of gaseous components, in accordance with an implementation of the present subject matter.

FIG. 6(a) illustrates a TEM-EDS image showing platinum and $PtO_x$. As can be observed from FIG. 6(a), the pair of electromigrated regions 602a and 602b predominantly comprise platinum (indicated by grey dots) while the notch portion 604 predominantly comprises $PtO_x$ indicating that the notch portion 604 includes the active metal oxide used for sensing of gaseous components.

Example 2

Real-Time Monitoring of Gaseous Components

In this example, the platinum based nano-sensor mounted in a chamber with the provision to connect the oxygen gas cylinder through mass flow controller (MFCs), which control the flow as well as concentration of oxygen. One MFC was used to set the oxygen gas flow in gas chamber with gas flow rate of 500 sccm.

The fixed potential difference of 0.4V was applied between the pair of contact pads the platinum based nano-sensor. Real-time monitoring of the nano-sensor current was recorded using the Matlab R2010a program. For real-time monitoring, data acquisition was performed every second.

The nano-sensor current was found to be stable in ambient conditions indicated by graphical region 602a. It was observed, as indicated by graphical region 604a, that nano-sensor current decreased when exposed to 100% oxygen due to oxidation of the sensing electrode assembly of the platinum based nano-sensor on exposure of oxygen, which results in $PtO_x$/Pt nano-sensor. In this way, oxidation of 10 nm, 20 nm, 40 nm and 60 nm thick Pt based nano-sensor was performed at fixed voltage. The applied bias voltage for oxidation was found to vary from ~0.7V (10 nm thick Pt nanowire) to ~0.4V (60 nm thick Pt nanowire).

Example 3

Hydrogen Sensing

In this example, study was conducted to observe the effect of increasing number of nano-sensors on a die. The nano-sensor (comprising a single nano-sensor) and nano-sensor array (comprising two and more nano-sensors) were mounted in a gas calibration chamber.

The gas calibration chamber had the provision to connect the target gas cylinder (hydrogen) along with synthetic air (80% nitrogen and 20% oxygen) cylinder to set the appropriate concentration of hydrogen gas. Two MFCs were used to set the gas flows for synthetic air and target gas ($H_2$) with a static gas mixer to uniformly mixed the target gas with synthetic air before introducing in gas chamber.

Total gas flow rate was fixed to 500 sccm for each concentration. The real-time monitoring of nano-sensor's signal is recorded by using the Matlab R2010a program, where the data acquisition is done every second. The response time is calculated by using the time taken by the sensor to span 10% to 90% of the steady state resistance, when gas/analyte is introduced. The resistance of $PtO_x$/Pt nano-sensor was found to increase on exposure to $H_2$ gas due to reducing nature of the gas and change in resistance. The response (S) was calculated by using the following formula:

$$S(\%) = [(R_g - R_a)/R_a] \times 100, \text{ where}$$

$R_a$ is nano-sensor resistance in air;
$R_g$ is the nano-sensor resistance in presence of hydrogen gas.

Figure 6C:
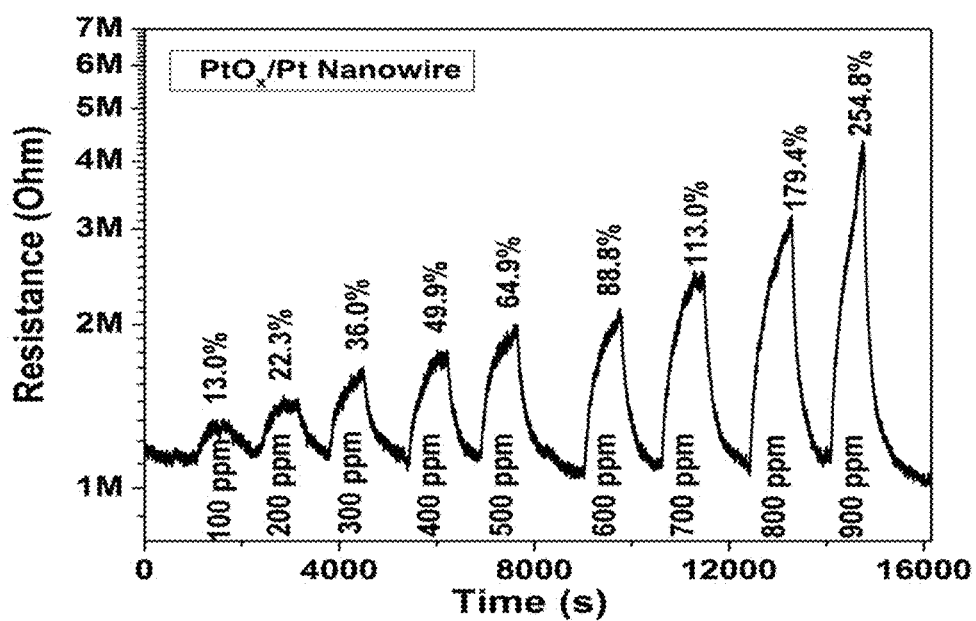
FIG. 6(c) illustrates a graph depicting results of hydrogen sensing, in accordance with an implementation of the present subject matter.

Sensing characteristics for oxidized 10 nm, 20 nm, 40 nm and 60 nm thick Pt nano-sensor was studied for hydrogen concentration of 100 ppm. All nano-sensors demonstrate a response to hydrogen at room temperature. Among all the nano-sensors, 60 nm thick oxidized nano-sensors showed the maximum response at optimum bias voltage of 0.25 V. This may be due to the optimum Pt to $PtO_x$ ratio formed during oxidation of 60 nm thick nanowires. FIG. 6(c) illustrates a graph depicting results of hydrogen sensing, in accordance with an implementation of the present subject matter. FIG. 6(c) indicates increase in detection of gaseous component with increase nano-sensors on a nano-sensor array from left to right.

Figure 6D:
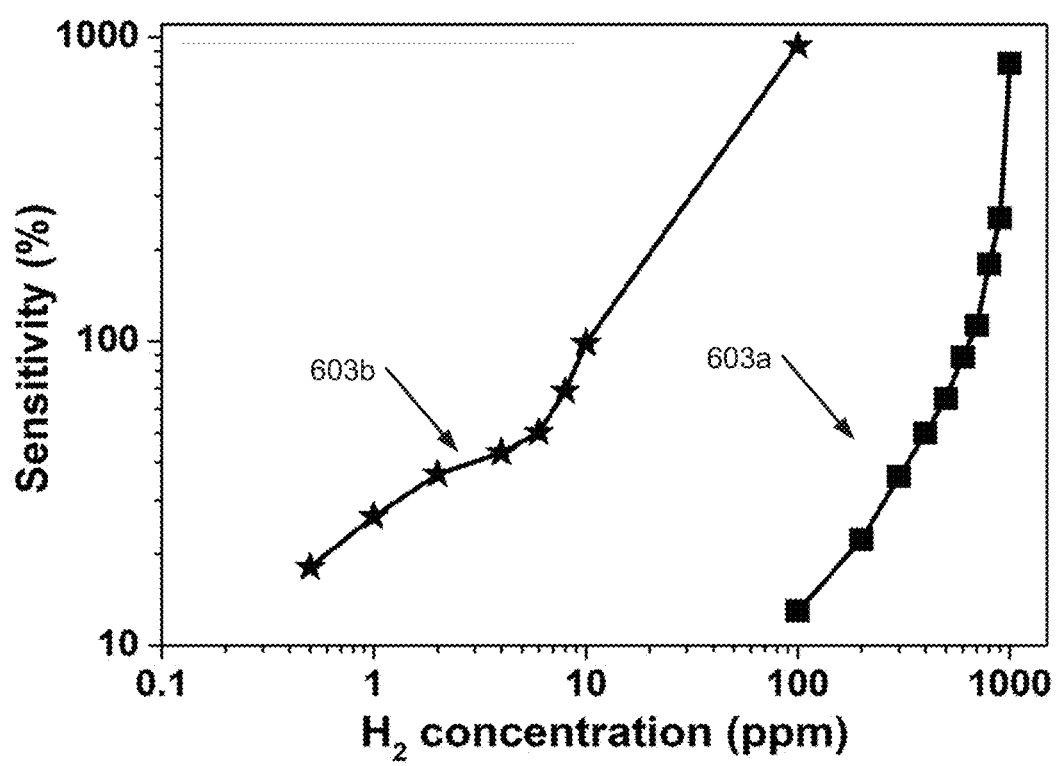
FIG. 6(d) illustrates a graph depicting results of hydrogen sensing using a nano-sensor and a nano-sensor array, in accordance with an implementation of the present subject matter.

FIG. 6(d) illustrates a graph depicting results of hydrogen sensing using a nano-sensor and a nano-sensor array, in accordance with an implementation of the present subject matter. Response of the nano-sensor is depicted by line 603a and response of the nano-sensor array is depicted by line 603b. It was observed that the nano-sensor had a Limit of Detection (LOD) of below 100 ppm and the nano-sensor array had an LOD of below 500 ppb. Further, it was also observed that power consumption of nano-sensor array was ~45 nW compared to the power consumption of the single nano-sensor of ~80 nW.

The present subject matter, therefore, uses a simple top-down manufacturing technique for fabrication of nano-sensors and nano-sensor arrays. The nano-sensor and the nano-sensor arrays has a high selectivity to detect sub-ppm ranges of gaseous components.

Although the subject matter has been described in considerable detail with reference to certain examples and implementations thereof, other implementations are possible. As such, the scope of the present subject matter should not be limited to the description of the preferred examples and implementations contained therein.

We claim:

1. A method for fabricating a nano-sensor array comprising:
    patterning a sensing electrode assembly on a sacrificial layer deposited over a substrate, wherein the sensing electrode assembly comprises a pair of contact pads and a plurality of electrode elements coupled to and disposed between the pair of contact pads;
    forming the sensing electrode assembly based on the patterning on a sacrificial layer deposited over a substrate;
    removing the sacrificial layer below a portion of each of the plurality of electrode elements to obtain a plurality of suspended electrode elements; and
    applying, to obtain a nano-sensor array, a potential difference between the pair of contact pads for a predetermined time to heat the suspended electrode elements to a first predetermined temperature, such as to oxidize the plurality of suspended electrode elements, wherein the potential difference applied between the pair of contact pads is based on Joule self-heating to create an oxide coated suspended electrode element at the first predetermined temperature, and wherein the applied potential difference depends on thickness of the sensing electrode assembly; and
    obtaining a pair of electromigrated regions on each suspended electrode element corresponding to the oxide coated suspended electrode element and a notch portion between the pair of the electromigrated regions, wherein the notch portion is to detect a gaseous component in an ambient gas at a second predetermined temperature, the second predetermined temperature being less than the first predetermined temperature, wherein the first predetermined temperature lies in a range of 600-800° C. and the second predetermined temperature lies in a range of 20-50° C., and wherein the nano-sensor array comprises a plurality of nano-sensors.

2. The method as claimed in claim 1, wherein a thickness of the sacrificial layer is in a range of 10 nm to 100 nm and a thickness of the substrate is in a range of 50 μm to 500 μm.

3. The method as claimed in claim 1, wherein the patterning is by Electron Beam Lithography and forming is by Direct Current Sputtering.

4. The method as claimed in claim 1, wherein removing the sacrificial layer is by etching.

5. The method as claimed in claim 1, wherein the sensing electrode assembly is fabricated from metal selected from the group consisting of tungsten, nickel, palladium, titanium, and platinum.

* * * * *